(12) United States Patent
Takatsu et al.

(10) Patent No.: US 7,953,758 B2
(45) Date of Patent: May 31, 2011

(54) WORKFLOW MANAGEMENT METHOD AND WORKFLOW MANAGEMENT APPARATUS

(75) Inventors: Kazunori Takatsu, Kanagawa (JP); Katsushi Morimoto, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 359 days.

(21) Appl. No.: 11/937,128

(22) Filed: Nov. 8, 2007

(65) Prior Publication Data

US 2008/0114791 A1    May 15, 2008

(30) Foreign Application Priority Data

Nov. 10, 2006  (JP) .................................. 2006-305429
Oct. 18, 2007  (JP) .................................. 2007-271529

(51) Int. Cl.
G06F 17/30    (2006.01)
(52) U.S. Cl. ......... 707/796; 707/803; 707/804; 707/807
(58) Field of Classification Search .................. 707/100, 707/796

See application file for complete search history.

(56) References Cited

U.S. PATENT DOCUMENTS

| | | | | |
|---|---|---|---|---|
| 6,782,379 | B2 * | 8/2004 | Lee | 1/1 |
| 6,938,069 | B1 * | 8/2005 | Narayanaswamy | 709/204 |
| 7,043,488 | B1 * | 5/2006 | Baer et al. | 1/1 |
| 7,143,091 | B2 * | 11/2006 | Charnock et al. | 1/1 |
| 7,349,912 | B2 * | 3/2008 | Delany et al. | 707/694 |
| 7,415,485 | B2 * | 8/2008 | Brooks et al. | 1/1 |
| 7,487,182 | B2 * | 2/2009 | Kataria et al. | 1/1 |
| 2002/0083059 | A1 * | 6/2002 | Hoffman et al. | 707/9 |
| 2003/0101133 | A1 * | 5/2003 | DeFrancesco et al. | 705/38 |
| 2005/0154741 | A1 * | 7/2005 | Hebert et al. | 707/100 |
| 2006/0074933 | A1 * | 4/2006 | Barac et al. | 707/100 |

FOREIGN PATENT DOCUMENTS

JP    2006-65874    3/2006

* cited by examiner

Primary Examiner — Don Wong
Assistant Examiner — Binh V Ho
(74) Attorney, Agent, or Firm — Oblon, Spivak, McClelland, Maier & Neustadt, L.L.P.

(57) ABSTRACT

A disclosed workflow management method includes a workflow starting step of determining a workflow based on one or more tags attached to a workflow document, attaching a status tag and a participant tag to the workflow document, and starting the workflow; and a review/approval step of requesting review and/or approval of the workflow document based on the status tag and the participant tag and updating the status tag and the participant tag after the review and/or approval.

12 Claims, 24 Drawing Sheets

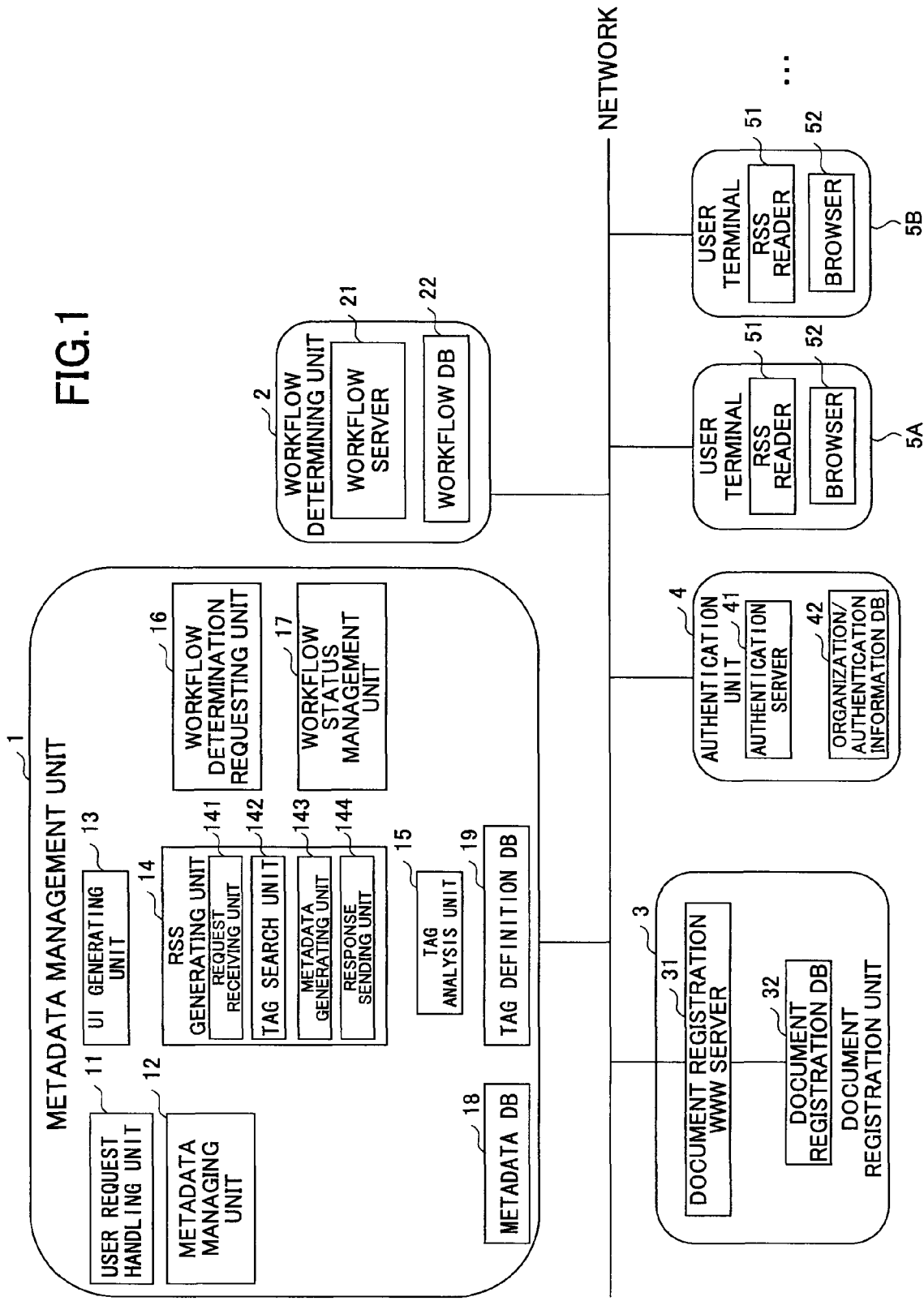

| ID | DOCUMENT ID | TAG |
|---|---|---|
| 1 | 333 | Invention_Report XYZ_Laboratory |
| 2 | 555 | Invention_Report:ABC_Laboratory |
| 3 | 7 | XXX_Report:ABC_Laboratory YYY_Group |
| 4 | 3 | ZZZ_Notice |
| 5 | 1 | Purchase_Request XYZ_section |

FIG.4

| ID | TAG | DEFINITION |
|---|---|---|
| 1 | To:(name) | Destination. Authentication required. |
| 2 | CC:(name) | Additional destination. Authentication required. |
| 3 | Creator:(name) | Creator |
| 4 | Altered:(name) | User who altered the document |
| 5 | Requesting_Approval | Approval is being requested. Wait for approval of a user specified by "To" tag. |
| 6 | Approved:(name) | Approved by the specified user. Inform the creator that the document has been approved by email. |
| 7 | Requesting_Review | Review is being requested. Wait for completion of review by a user specified by "To" tag. |
| 8 | Reviewed:(name) | Reviewed by the specified user. Inform the next participant or the creator that the document has been reviewed. |
| 9 | Rejected:(name) | Rejected by the specified user. Inform the creator that the document has been rejected. |
| 10 | WFZ:(name):(name):⋯ | Workflow participants |

FIG.5

| TAG | WORKFLOW | DESCRIPTION |
|---|---|---|
| Invention_Report XYZ_Laboratory | (CREATOR)→(LEADER)→(MANAGER)<br>\|           \|           \|<br>SUZUKI  SATO  TANAKA | Regarding RSS |
| Invention_Report ABC_Laboratory | SUZUKI→SATO→TANAKA | Regarding ... |
| XXX_Report ABC_Laboratory YYY_Group | XXX→YYY→ZZZ | Regarding ... |
| ZZZ_Notice | ZZZ→YYY→XXX | Regarding ... |
| Purchase_Request XYZ_Section | YYY→ZZZ→XXX | About the purchase of ... |
| .. | .. | .. |

FIG.6

| ID | DOCUMENT NAME | URL |
|---|---|---|
| 1 | kaimono.doc | http://hoge.com/ |
| 2 | hege.doc | http://localhost/doc/ |
| 3 | hoge2.doc | http://hege3.jp/documents/ |
| 777 | hoge.doc | http://hoge.com/ |
| 333 | pat.doc | http://hoge.com/Oxlab |
| 555 | pat.doc | http://hoge.com/Oshikakulab |
| 7 | sankaku.doc | http://hoge.com/Oshikakulab/xxparty |
| 3 | nantara.doc | http://hoge.com/dept.sankakusankaku |

| ID | NAME | ORGANIZATIONAL UNIT | POSITION | PASSWORD |
|----|------|---------------------|----------|----------|
| 1 | SUZUKI | XYZ LABORATORY | STAFF | ***** |
| 2 | SATO | XYZ LABORATORY | LEADER | ***** |
| 3 | TANAKA | XYZ LABORATORY | MANAGER | ***** |

42

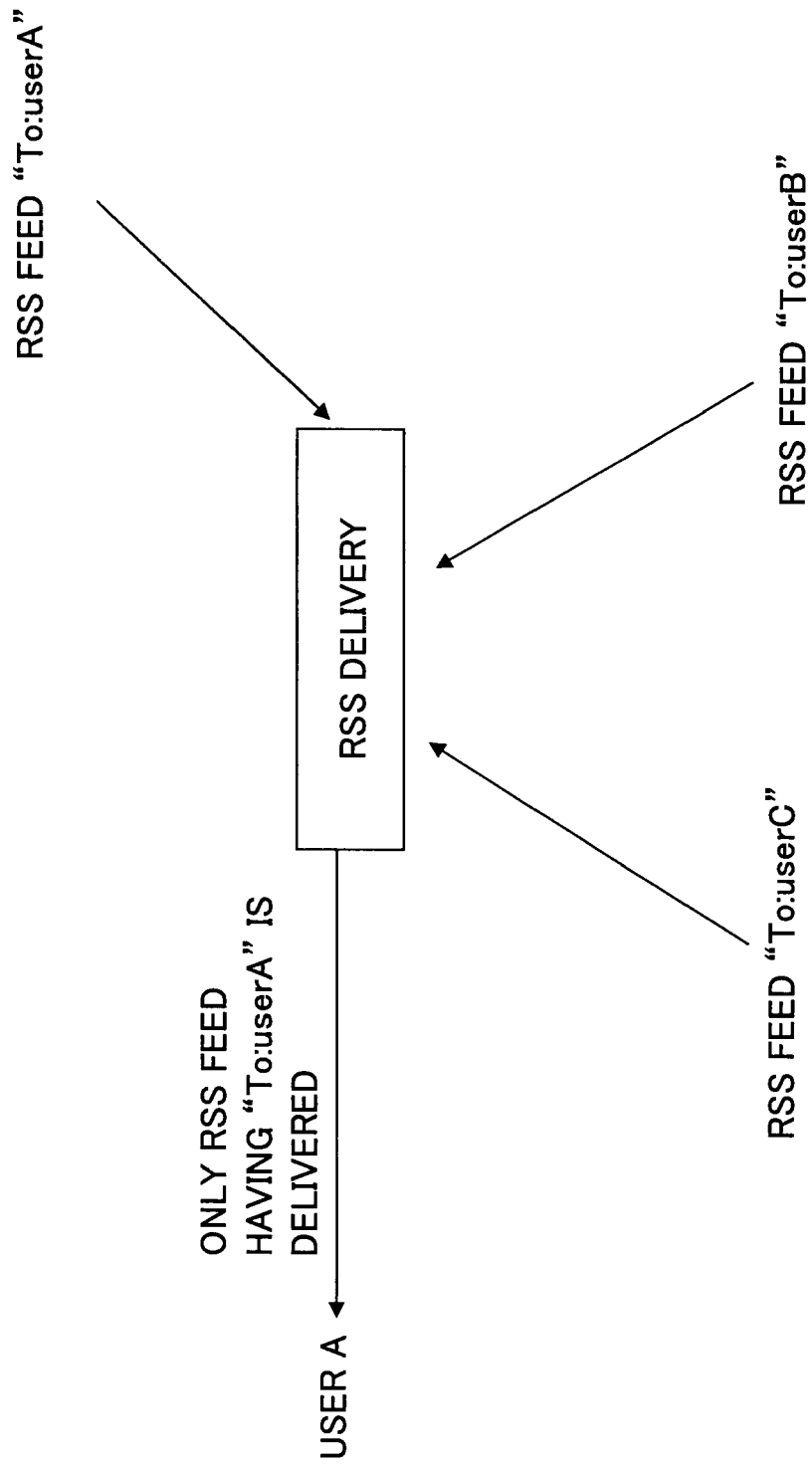

FIG.16A  http://server/tag/[tags]/[value]/rss

FIG.16B  http://server/tag/To/userA/rss

FIG.16C  http://server/tag/[tags]/rss

FIG.16D  http://server/tag/tag1/rss

FIG.16E  http://server/tag/XYZ_Laboratory/rss

FIG.16F  http://server/tag/tag1%20tag2/rss

FIG.16G  http://server/tag/XYZ_Laboratory%20Invention_Report/rss

FIG.16H  http://server/tag/To%20userA/rss

FIG.17A

```
<?xml version="1.0" encoding="UTF-8" ?>
<rss version="2.0">
<channel>
  <title>DOCUMENTS TO BE REVIEWED/APPROVED BY XYZ</title>
  <link>http://hoge.jp/workflow?name=XYZ</link>
  <description>ENJOY YOUR WORK!</description>
  <language>ja</language>
  <item>
    <title>FOR REVIEW</title>
    <link> http://hoge.jp/workflow?name=XYZ&action=review</link>
    <pubDate>Fri, 28 Jul 2006 13:53:22 JST</pubDate>
    <description>There are five documents.</description>
  </item>
  <item>
    <title>FOR APPROVAL</title>
    ..
  </item>
  ..
</channel>
</rss>
```

FIG.17B

DOCUMENTS TO BE REVIEWED
/APPROVED BY XYZ
ENJOY YOUR WORK!

TITLE          DESCRIPTION

FOR REVIEW     There are five documents.
FOR APPROVAL
..             ..

FIG.18A

```
<?xml version="1.0" encoding="UTF-8" ?>
<rss version="2.0">
  <channel>
    <title>FOR REVIEW</title>
    <link>http://hoge.jp/workflow?name=XYZ&action=review </link>
    <description> There are five documents.</description>
    <language>ja</language>
    <item>
      <title>PURCHASE REQUEST</title>
      <link> http://hoge.jp/workflow?name=XYZ&action=review
            &type=purchase&id=p12345</link>
      <pubDate>Fri, 28 Jul 2006 13:53:22 JST</pubDate>
      <description>Request for the purchase of XXX.</description>
      <enclosure url="http://hoge.com/hoge.doc" />
    </item>
    <item>
      <title>REPORT</title>
      ..
    </item>
    ..
  </channel>
</rss>
```

FIG.18B

FOR REVIEW
There are five documents.

| TITLE | DESCRIPTION |
|---|---|
| PURCHASE REQUEST | Request for the purchase of XXX. |
| REPORT | .. |
| .. | .. |

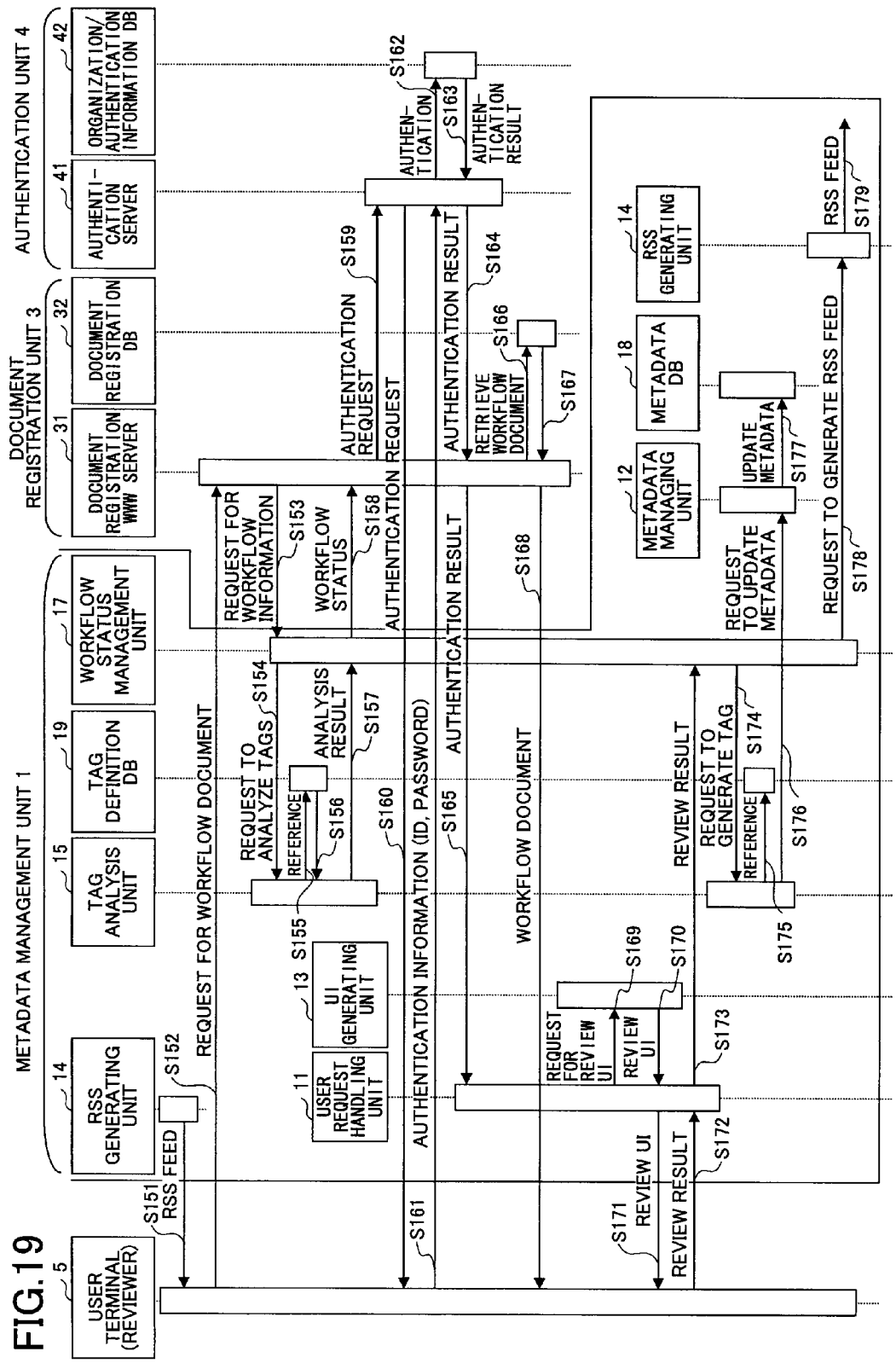

| ID | USER/ORGANIZATIONAL UNIT | TAG |
|---|---|---|
| 1 | U1 | TAG1 TAG2 TAG3 |
| 2 | U2 | TAG1 TAG22 TAG23 |
| 3 | SECTION 1 | TAG22 TAG3 |
| . | . | . |
| . | . | . |
| . | . | . |

FIG.24

```
<dept id=1 name=" XYZ LABORATORY">
 <doc_type>
  <item id=1 name=" ACCOUNTING">
    <button id=1 name=" BUDGET" tag=" Budget_Document">  ~D4
    <button id=2 name=" PURCHASE" tag=" Purchase_Request">
           ⋮
  </item>
  <item id=2 name=" REPORT">
    <button id=1 name=" TECHNICAL" tag=" Technical_Report">
    <button id=2 name=" SALES" tag=" Sales_Report">
           ⋮
  </item>
           ⋮
 </doc_type>
</dept>
<dept id=2 name=" ABC BRANCH">
 <doc_type>
    ⋮
 </doc_tpye>
</dept>
<dept id=3 name="······">
 <doc_type>
    ⋮
 </doc_tpye>
</dept>
   ⋮
```

D1, D2, D3, D4 braces indicate nested groupings of the XML structure.

WORKFLOW MANAGEMENT METHOD AND WORKFLOW MANAGEMENT APPARATUS

BACKGROUND OF THE INVENTION

1. Field of the Invention

The present invention generally relates to a workflow management method and a workflow management apparatus.

2. Description of the Related Art

Various types of workflow systems for electronically reviewing and approving documents in an organization such as a company have been proposed (see, for example, patent document 1).

In a conventional workflow system, a creator (or a drafter) of a document determines a workflow by referring to rules in one's organization and assigns participants to the workflow who review and/or approve the document in sequence.

[Patent document 1] Japanese Patent Application Publication No. 2006-65874

A conventional workflow system as described above has the following problems:

(1) It is troublesome for a creator of a document to determine a workflow by referring to rules in one's organization.

(2) A conventional workflow system normally uses a dedicated architecture for handling workflow documents and tasks. Such a workflow system
  Requires complicated maintenance.
  Requires a dedicated client application.
  Lacks in flexibility and scalability.
  Cannot cooperate with an existing document management system having no workflow function.

SUMMARY OF THE INVENTION

Embodiments of the present invention provide a workflow management method and a workflow management apparatus that solve or reduce one or more problems caused by the limitations and disadvantages of the related art.

An embodiment of the present invention provides a workflow management method including a workflow starting step of determining a workflow based on one or more tags attached to a workflow document, attaching a status tag and a participant tag to the workflow document, and starting the workflow; and a review/approval step of requesting review and/or approval of the workflow document based on the status tag and the participant tag and updating the status tag and the participant tag after the review and/or approval.

Another embodiment of the present invention provides a workflow management apparatus including a workflow starting unit configured to determine a workflow based on one or more tags attached to a workflow document, to attach a status tag and a participant tag to the workflow document, and to start the workflow; and a review/approval unit configured to request review and/or approval of the workflow document based on the status tag and the participant tag and to update the status tag and the participant tag after the review and/or approval.

BRIEF DESCRIPTION OF THE DRAWINGS

FIG. 1 is a drawing illustrating a configuration of an exemplary workflow system according to an embodiment of the present invention;

FIG. 4 is a table showing an exemplary tag definition DB;

FIG. 5 is a table showing an exemplary workflow DB;

FIG. 6 is a table showing an exemplary document registration DB;

FIG. 7 is a table showing an exemplary organization/authentication information DB;

FIG. 15 is a drawing used to describe how RSS feeds are filtered in an RSS delivery process;

FIGS. 16A through 16H show examples of RSS feed requests sent from an RSS reader of a user terminal to a metadata management unit;

FIGS. 17A and 17B are drawings illustrating source code and a display of an RSS feed;

FIGS. 18A and 18B are drawings illustrating source code and a display of another RSS feed;

FIG. 19 is a sequence chart showing an exemplary review process;

FIG. 24 shows code describing relationships between tags and buttons representing document types and organizational units.

DESCRIPTION OF THE PREFERRED EMBODIMENTS

Figure 2A:
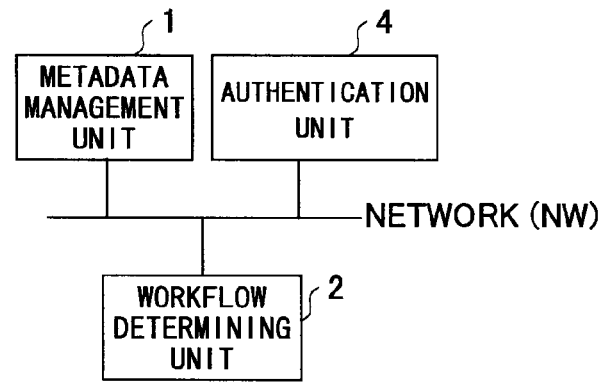
FIGS. 2A through 2E are drawings illustrating variations of the exemplary workflow system.

Preferred embodiments of the present invention are described below with reference to the accompanying drawings.

<System Configuration>

FIG. 1 is a drawing illustrating a configuration of an exemplary workflow system according to an embodiment of the present invention.

As shown in FIG. 1, the exemplary workflow system includes a metadata management unit 1 that manages tags attached to workflow documents (i.e. documents to be circulated and reviewed and/or approved in workflows) as metadata and is a central unit of the exemplary workflow system; a workflow determining unit 2 for determining workflows according to requests from the metadata management unit 1; a document registration unit 3 for storing information on workflow documents; an authentication unit 4 for authenticating users according to requests from the metadata management unit 1 or the document registration unit 3; and user terminals 5 (5A, 5B, . . . ) such as personal computers (PCs)

operated by users of the exemplary workflow system. In the exemplary workflow system, the above components are connected to each other via a network.

The metadata management unit 1 includes a user request handling unit 11 for handling requests from users; a metadata managing unit 12 for managing metadata; a UI generating unit 13 for generating user interfaces (UI; e.g. screens) to be displayed on the user terminals 5; an RSS generating unit 14 for generating and sending metadata of workflow documents in an RSS format in response to requests from the user terminals 5 (RSS stands for Resource Description Framework (RDF) Site Summary, Rich Site Summary, or Really Simple Syndication); a tag analysis unit 15 for analyzing tags attached to workflow documents; a workflow determination requesting unit 16 for requesting the workflow determining unit 2 to determine workflows; a workflow status management unit 17 for managing statuses of workflows; a metadata database (DB) 18 for storing tags attached to workflow documents as metadata; and a tag definition database (DB) 19 for storing definitions of tags. The RSS generating unit 14 includes a request receiving unit 141 for receiving RSS feed requests via the user request handling unit 11; a tag search unit 142 for causing the metadata managing unit 12 to search the metadata DB 18 for workflow documents based on tags; a metadata generating unit 143 for generating metadata (RSS data or RSS feeds) of workflow documents found by the tag search unit 142; and a response sending unit 144 for sending the generated RSS feeds to the requesting user terminals 5.

The workflow determining unit 2 includes a workflow server 21 for responding to accesses via a network and a workflow database (DB) 22 for storing workflow definitions.

The document registration unit 3 includes a document registration WWW server 31 for responding to accesses via a network and a document registration database (DB) 32 for storing information on workflow documents. The document registration WWW server 31 may be provided for each document type.

The authentication unit 4 includes an authentication server 41 for responding to accesses via a network and an organization/authentication information database (DB) 42 for storing organization information (indicating divisions, departments, etc., where users belong) and authentication information of users. The organization/authentication information DB 42 may be divided into an organization DB and an authentication DB.

Each of the user terminals 5 includes an RSS reader 51 for receiving RSS feeds and a browser 52 for browsing pages indicated by links in the received RSS feeds.

Figure 2B:
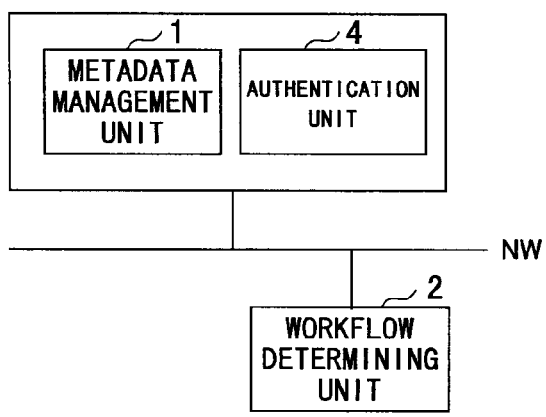
Figure 2C:
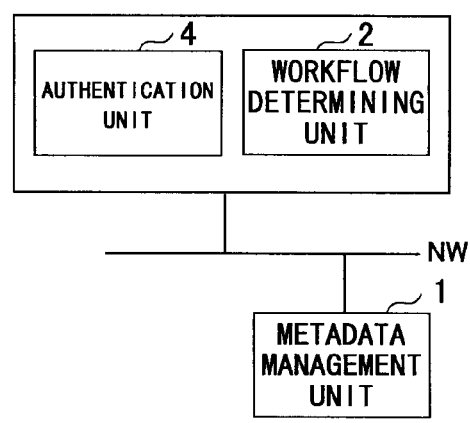
Figure 2D:
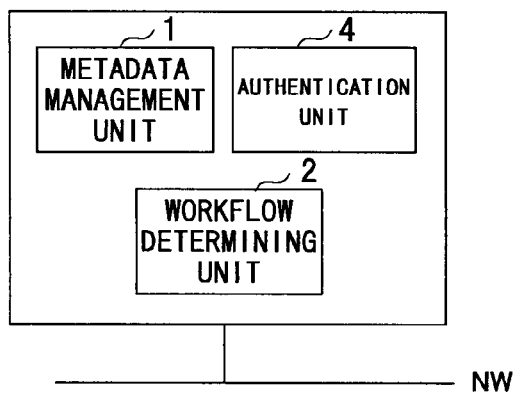
Figure 2E:
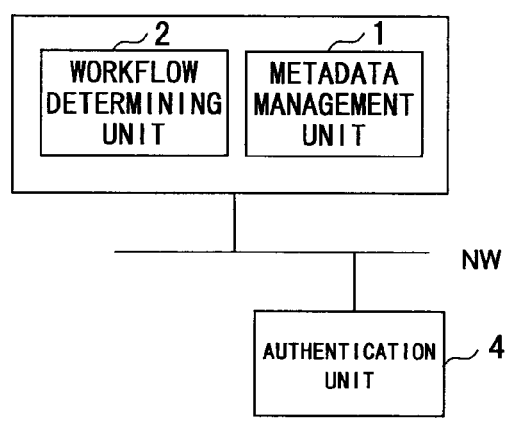

FIGS. 2A through 2E show variations of the exemplary workflow system. FIG. 2A shows a variation where the metadata management unit 1, the workflow determining unit 2, and the authentication unit 4 are provided separately. FIG. 2B shows a variation where the metadata management unit 1 and the authentication unit 4 are integrated. FIG. 2C shows a variation where the workflow determining unit 2 and the authentication unit 4 are integrated. FIG. 2D shows a variation where the metadata management unit 1, the workflow determining unit 2, and the authentication unit 4 are integrated. FIG. 2E shows a variation where the metadata management unit 1 and the workflow determining unit 2 are integrated.

Figure 3:
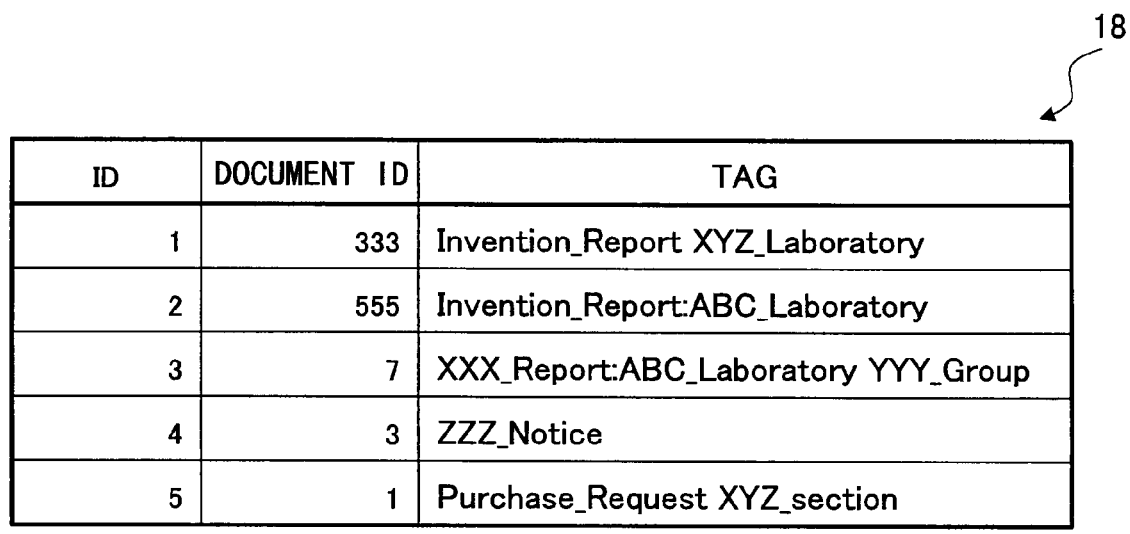
FIG. 3 is a table showing an exemplary metadata DB.

FIG. 3 shows an example of the metadata DB 18. Each record in the metadata DB 18 includes an ID for identifying the record, a document ID for identifying the corresponding workflow document, and one or more tags attached to the workflow document. A tag is a part of metadata. Metadata include information on a workflow document such as a document URL and tags.

Examples of tags relating to a workflow include: tags indicating types of tasks or documents, e.g. "Invention_Report", "Technical_Report", and "Request_For_Decision"; tags indicating organizational units, e.g. "XYZ_Laboratory" and "ABC_Department"; tags indicating informal groups, e.g. "XXX_Subcommittee" and "YYY_StudyGroup"; and tags indicating statuses, e.g. "In_Preparation", "In_Preparation: name", "Requesting_Review", "Approved:name", "Rejected", "To:name", "CC:name", and "To:archive". The exemplary workflow system may be configured such that tags indicating organizational units cannot be attached to a workflow document unless the users are authenticated.

Tags indicating the statuses of workflows and workflow documents are preferably protected from being altered without authorization or by mistake. Therefore, in this embodiment, tags indicating the statuses of workflows and workflow documents are treated as system tags that are automatically generated and altered by the exemplary workflow system and cannot be altered by the users. Examples of system tags include "Creator:name", "Creator:name(2006-08-31/23:59:59)", "Altered:name", "Altered:name(2006-08-31/23:59:59)", "To:name", "CC:name", "Requesting_Review", "Reviewed:name", "Reviewed:name(2006-08-31/23:59:59)", "Requesting_Approval", "Approved:name", "Approved:name(2006-08-31/23:59:59)", "Rejected", "Rejected:name", and "Rejected:name(2006-08-31/23:59:59)".

FIG. 4 shows an example of the tag definition DB 19. Each record in the tag definition DB 19 includes an ID for identifying the record, a tag, and the definition of the tag. In FIG. 4, each definition is written in a human-readable format. In actual implementation, however, each definition is expressed, for example, by a function executable by the workflow system.

FIG. 5 shows an example of the workflow DB 22. Each record in the workflow DB 22 includes one or more tags, a corresponding workflow, and a description of the workflow. Thus, in the workflow DB 22, workflows are associated with a tag or a combination of tags. This configuration makes it possible to assign multiple workflows to the same tag. Also, the descriptions of workflows make it easier to maintain the workflows in the workflow DB 22.

FIG. 6 shows an example of the document registration DB 32. Each record in the document registration DB 32 includes an ID for identifying the record, a document name, and a URL indicating the storage location of the document.

FIG. 7 shows an example of the organization/authentication information DB 42. Each record in the organization/authentication information DB 42 includes an ID for identifying the record, a user name, an organizational unit where the user belongs, a position of the user, and a password for authentication.

<Operation>

Figure 8:
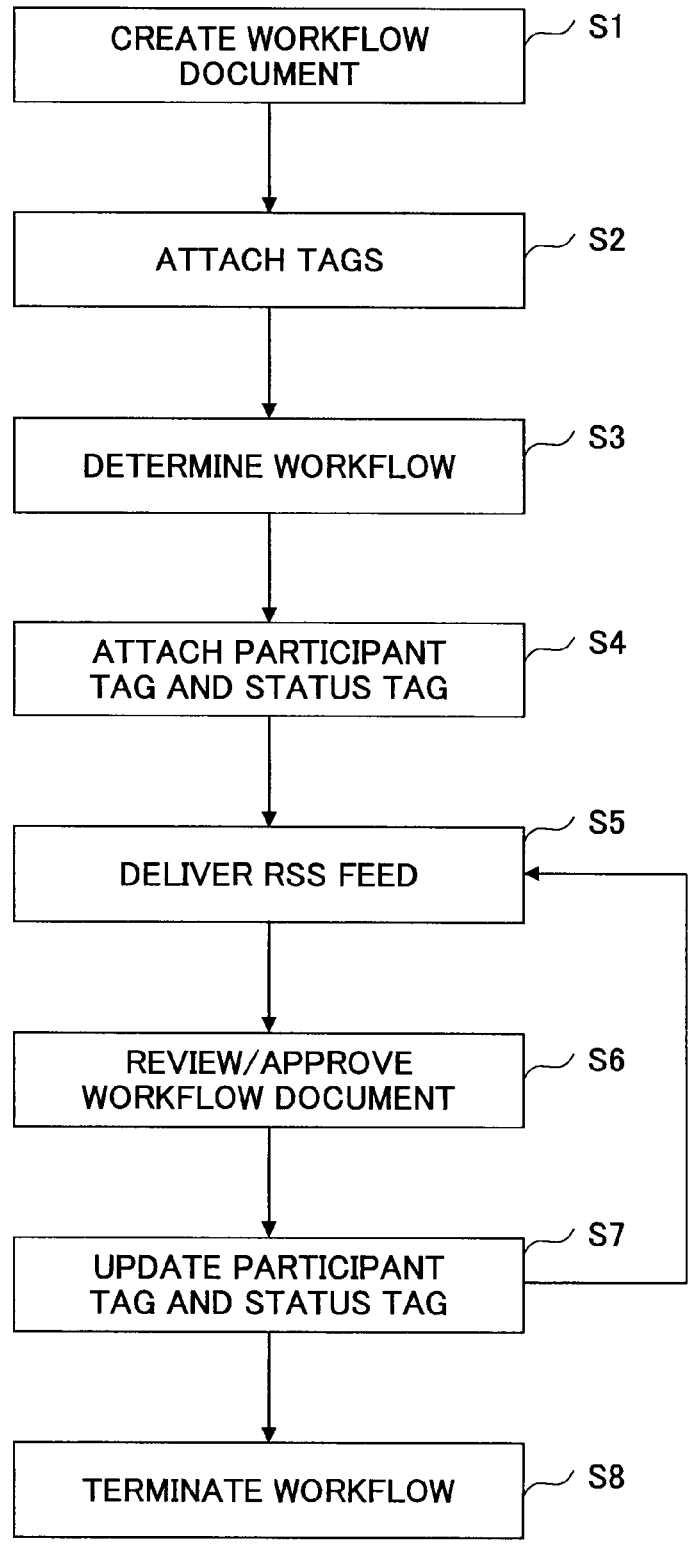
FIG. 8 is a flowchart showing an outline of a process in the exemplary workflow system.

FIG. 8 is a flowchart showing an outline of a process in the exemplary workflow system.

As shown in FIG. 8, a creator (or a drafter) creates a workflow document on one of the user terminals 5 (step S1), and attaches a tag or tags for determining a workflow to the created workflow document to register the workflow document in the workflow system (step S2).

The workflow system determines a workflow based on the tags attached by the creator (step S3) and attaches a participant tag indicating the first workflow participant and a status tag indicating a workflow status to the workflow document after confirmation by the creator (step S4).

Then, the workflow system delivers the metadata (including a title, a description, a URL, etc.) of the workflow document as an RSS feed to the first workflow participant (step S5).

When receiving the RSS feed, the first workflow participant reviews and/or approves the workflow document (step S6). Then, the workflow system updates the status tag based on the result of the review and/or approval, and updates the participant tag to indicate the next workflow participant if there is one (step S7). If there is another workflow participant, the workflow system repeats steps S5 through S7.

If no workflow participant is left or the workflow document is rejected by a workflow participant, the workflow system terminates the workflow (step S8).

Figure 9:
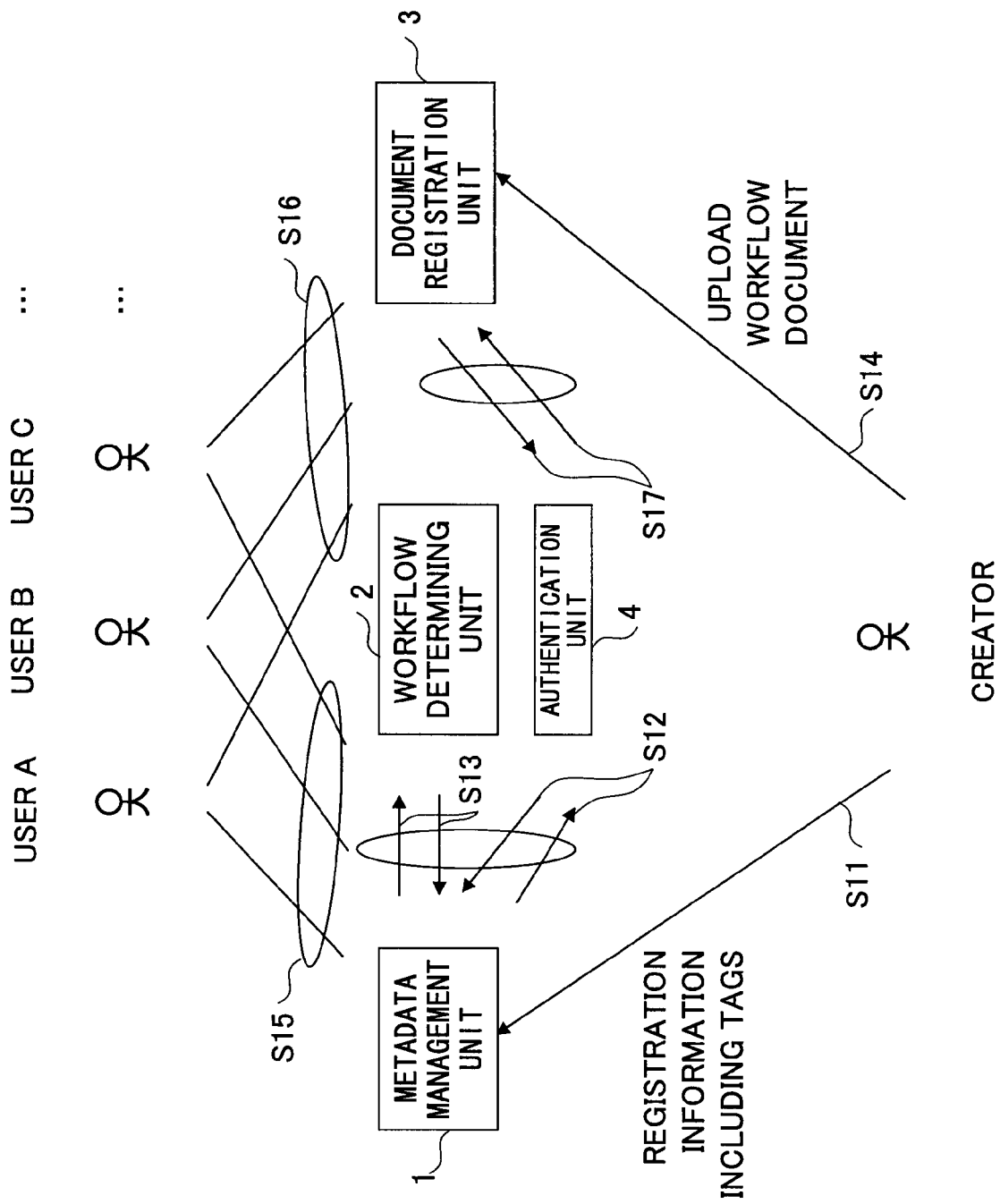
FIG. 9 is a flowchart showing a process via a network.

FIG. 9 is a flowchart showing a process via a network.

As shown in FIG. 9, the creator attaches one or more tags to a workflow document and requests the metadata management unit 1 to register the workflow document (step S11). The metadata management unit 1 causes the authentication unit 4 to authenticate the creator (step S12) and causes the workflow determining unit 2 to determine a workflow for the workflow document (step S13). Then, the creator uploads the workflow document to the document registration unit 3 (step S14).

Meanwhile, when receiving an RSS feed from the metadata management unit 1, each of users A, B, and C (workflow participants) reviews and/or approves the workflow document registered in the document registration unit 3, and returns the result to the metadata management unit 1 (steps S15 and S16). When each of the users A, B, and C accesses the document registration unit 3, the authentication unit 4 authenticates each of the users A, B, and C (step S17).

Figure 10:
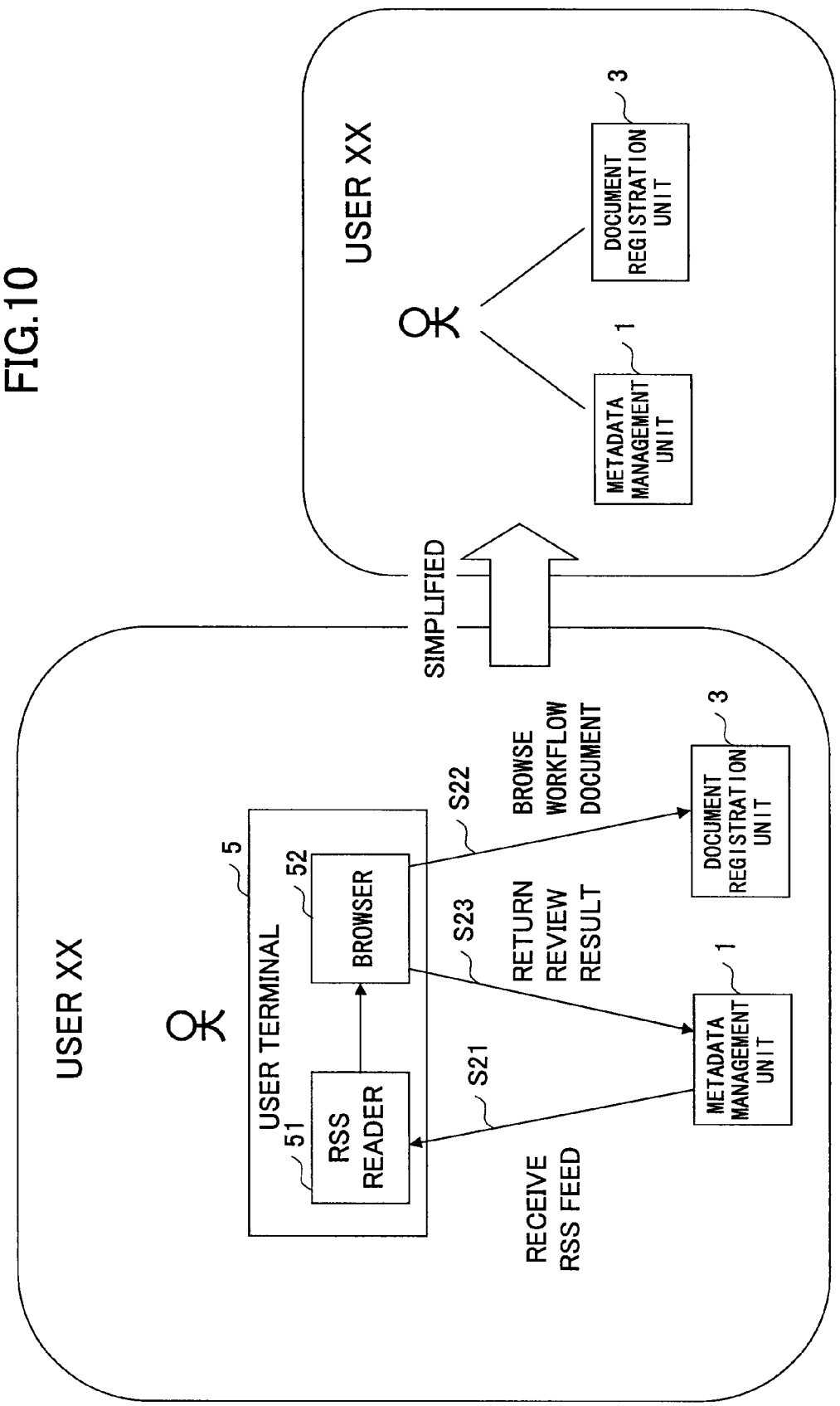
FIG. 10 is a drawing illustrating a process by a user.

FIG. 10 is a drawing illustrating a process by a user. FIG. 10 illustrates, in more detail, interactions of the user A, B, or C with the metadata management unit 1 and the document registration unit 3 shown in FIG. 9. In FIG. 9, the interactions are illustrated in a simplified manner as also shown in the right side of FIG. 10.

As shown in FIG. 10, a user XX receives an RSS feed from the metadata management unit 1 with the RSS reader 51 of the user terminal 5 (step S21), browses a workflow document registered in the document registration unit 3 by following a document link in the RSS feed with the browser 52 (step S22), and returns a review result to the metadata management unit 1 by using the browser 52 (step S23).

Figure 11:
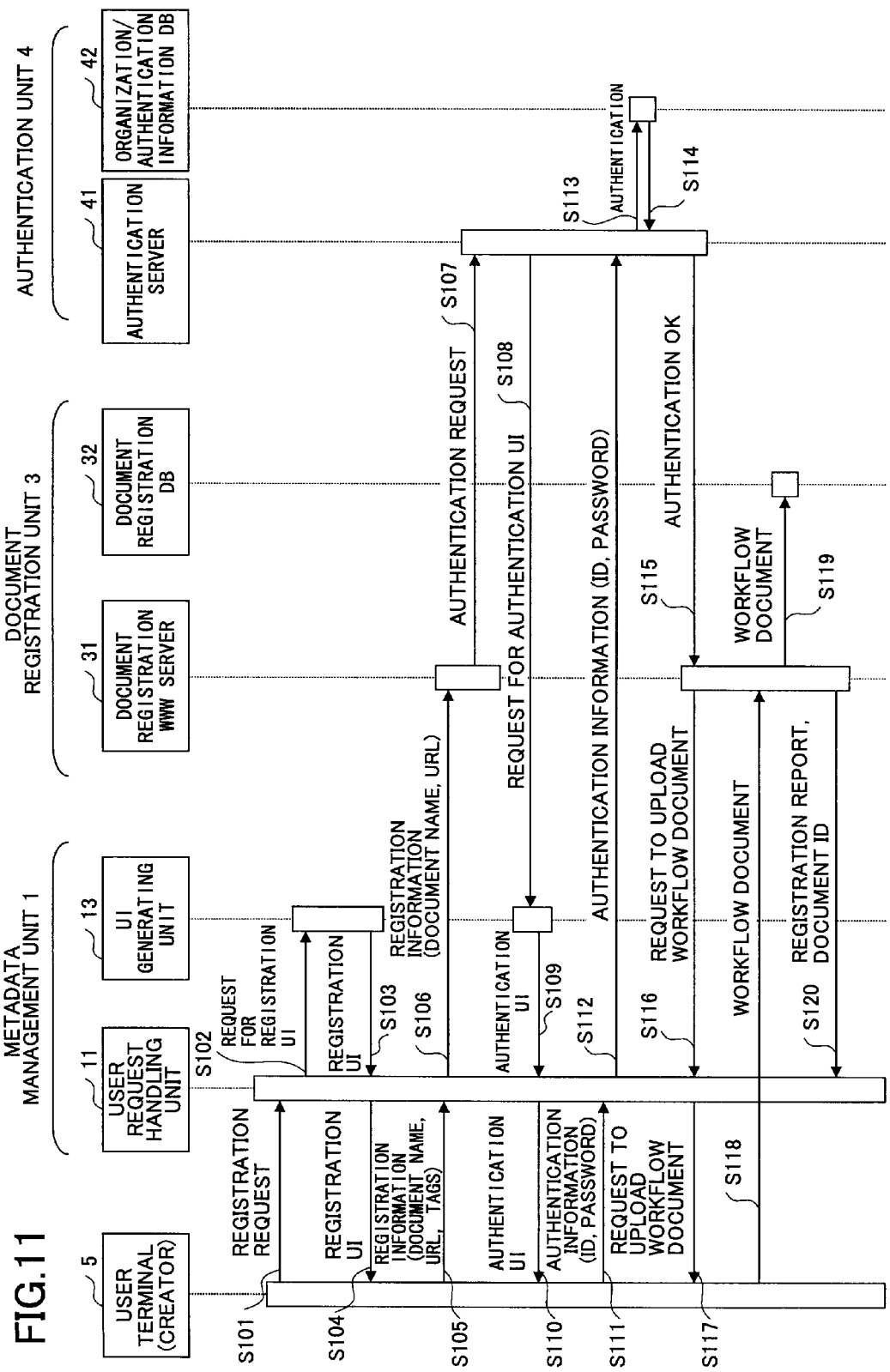
FIG. 11 is a sequence chart (part 1) showing exemplary steps of registering a workflow document through to starting a workflow.
Figure 12:
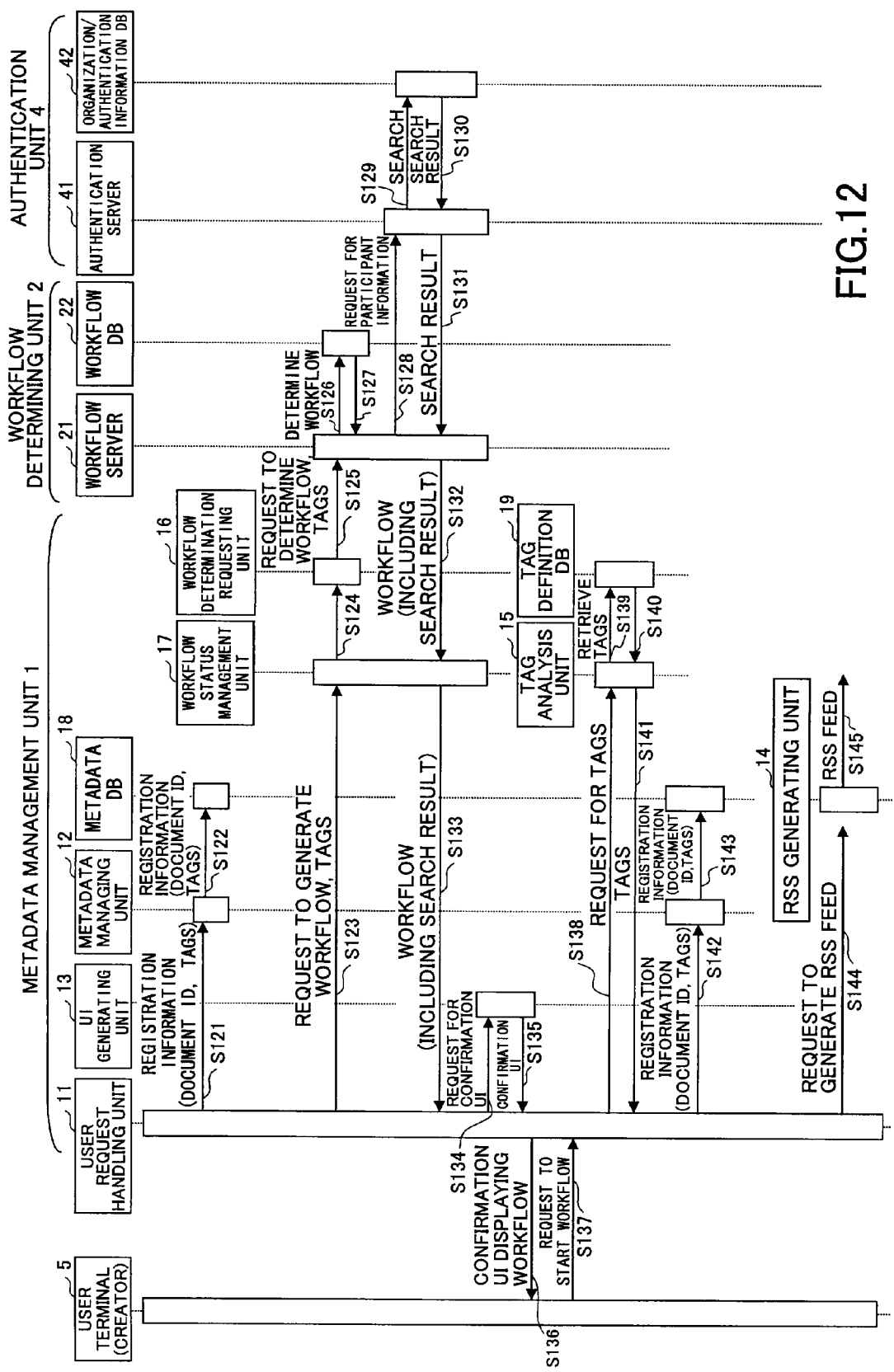
FIG. 12 is a sequence chart (part 2) showing exemplary steps of registering a workflow document through to starting a workflow.

FIGS. 11 and 12 are sequence charts showing exemplary steps of registering a document through to starting a workflow.

Figure 13:
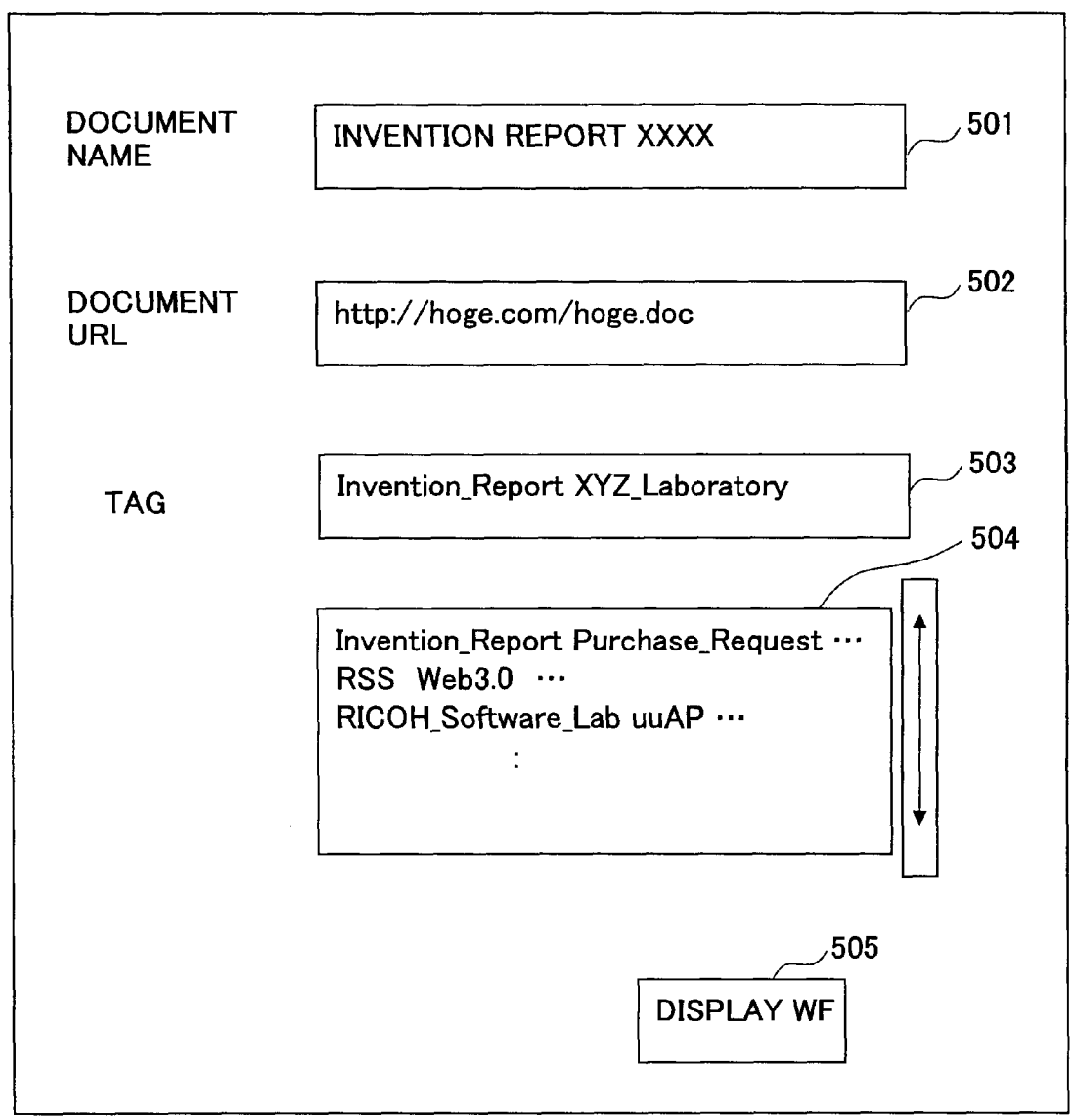
FIG. 13 is a drawing illustrating an exemplary user interface for registering a workflow document.

As shown in FIG. 11, a creator sends a request for registration of a workflow document to the user request handling unit 11 of the metadata management unit 1 from the user terminal 5 (step S101). The user request handling unit 11 requests the UI generating unit 13 to generate a registration UI (step S102), receives the created registration UI (step S103), and sends the registration UI to the user terminal 5 (step S104). FIG. 13 shows an example of a registration UI. The registration UI includes a document name entry field 501 for entering the document name of a workflow document to be registered, a document URL entry field 502 for entering a URL indicating the registration destination of the workflow document (e.g. a URL indicating a location on the document registration WWW server 31), a tag entry field 503 for entering tags used to determine a workflow for the workflow document (tags may be entered directly in the field or may be selected from a tag selection field 504), the tag selection field 504 providing a list of tags to be entered in the tag entry field 503, and a "Display WF" button 505 for searching for and displaying a workflow based on the conditions specified in the above fields.

Referring back to FIG. 11, the creator enters a document name, a URL, and tags on the registration UI using the user terminal 5 and clicks on the "Display WF" button 505 (requests to register the workflow document and to display a workflow) (step S105). Then, the user request handling unit 11 of the metadata management unit 1 sends a request for registration of the workflow document together with the document name and the URL to the document registration WWW server 31 of the document registration unit 3 (step S106).

The document registration server 31 requests the authentication server 41 of the authentication unit 4 to authenticate the creator. When requested, the authentication server 41 requests the UI generating unit 13 to generate an authentication UI (step S108). The UI generating unit 13 generates an authentication UI and sends it to the user request handling unit 11 (step S109). Then, the user request handling unit 11 sends the authentication UI to the user terminal 5 (step S110).

When the creator enters an ID and a password on the authentication UI using the user terminal 5 (step S111), the user request handling unit 11 of the metadata management unit 1 sends the entered authentication information to the authentication server 41 of the authentication unit 4 (step S112). The authentication server 41 checks the authentication information against information stored in the organization/authentication information DB 42 (steps S113 and S114), and if the creator is a legitimate user, sends the authentication result to the document registration WWW server 31 of the document registration unit 3 (step S115). The document registration WWW server 31 requests the user terminal 5 to upload the workflow document via the user request handling unit 11 of the metadata management unit 1 (steps S116 and S117).

In response to the request, the user terminal 5 sends the workflow document to the document registration WWW server 31 of the document registration unit 3 (step S118). The document registration WWW server 31 registers the workflow document in the document registration DB 32 (step S119). Then, the document registration WWW server 31 sends a registration report and an ID of the registered workflow document (document ID) to the user request handling unit 11 of the metadata management unit 1 (step S120).

Referring to FIG. 12, the user request handling unit 11 of the metadata management unit 1 sends the document ID and the tags to the metadata managing unit 12 (step S121). The metadata managing unit 12 registers the document ID and the tags in the metadata DB 18 (step S122).

Next, the user request handling unit 11 sends a request to generate a workflow together with the tags to the workflow status management unit 17 (step S123). The workflow status management unit 17 sends the request and the tags to the workflow determination requesting unit 16 (step S124).

The workflow determination requesting unit 16 sends a request to determine a workflow together with the tags to the workflow server 21 of the workflow determining unit 2 (step S125). The workflow server 21 searches the workflow DB 22 based on the tags and thereby determines a workflow (steps S126 and S127).

Then, the workflow server 21 requests the authentication server 41 of the authentication unit 4 to obtain information on the workflow participants based on a tag indicating an organizational unit (step S128). The authentication server 41 searches the organization/authentication information DB 42 (steps S129 and S130) and returns the search result to the workflow server 21 of the workflow determining unit 2 (step S131). For example, when a tag indicates "XYZ_Laboratory" and the workflow includes a participant "leader", the authentication server 41 searches for a user whose organizational unit is "XYZ_Laboratory" and position is "leader", and obtains the name of the user "Sato".

The workflow server 21 sends workflow information including the search result to the workflow status management unit 17 (step S132). The workflow status management unit 17 sends the workflow information to the user request handling unit 11 (step S133).

Figure 14:
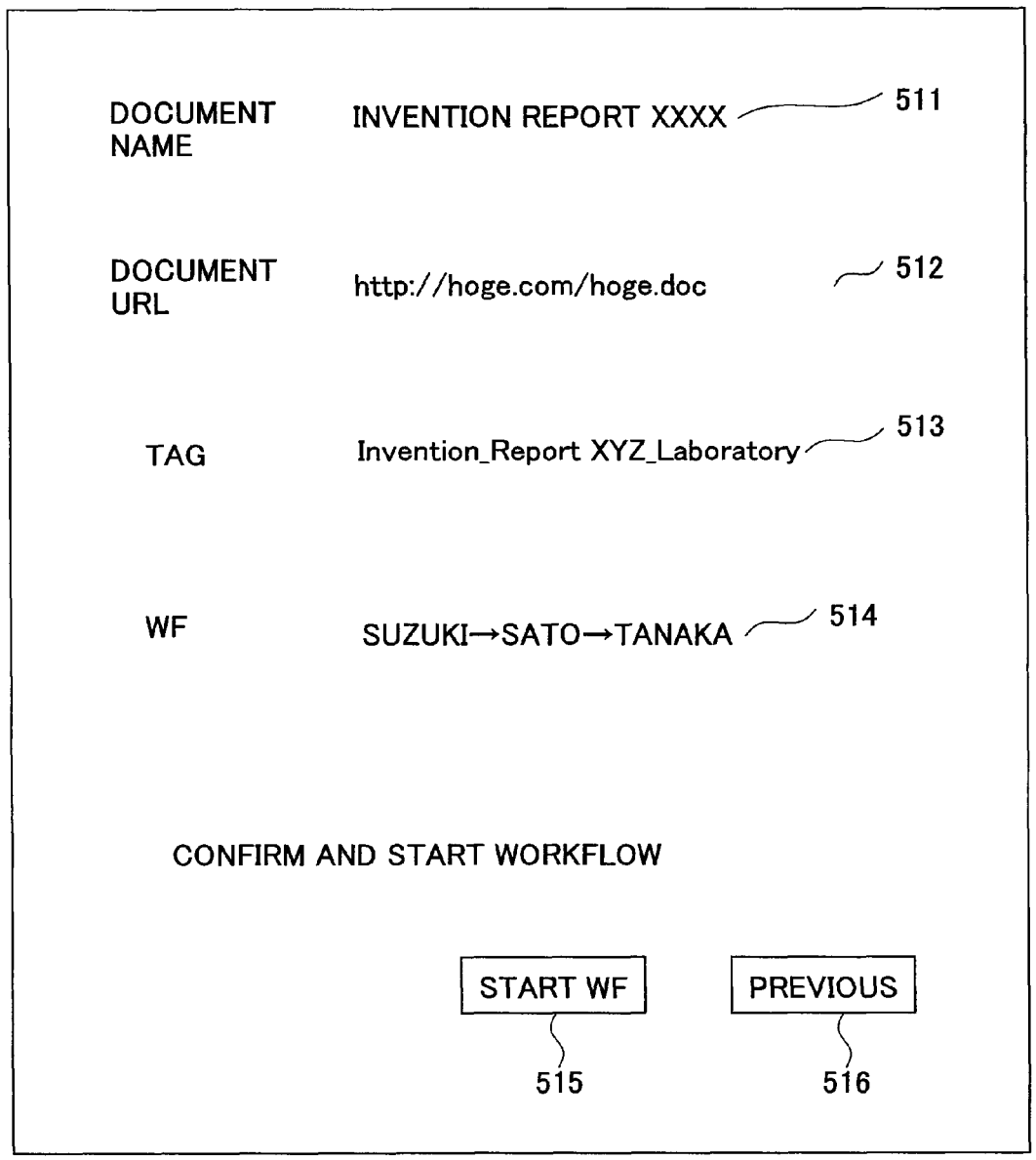
FIG. 14 is a drawing illustrating an exemplary user interface for confirming a workflow.

When receiving the workflow information, the user request handling unit 11 requests the UI generating unit 13 to generate a confirmation UI (step S134). The UI generating unit 13 generates the confirmation UI (step S135) and sends it to the user terminal 5 via the user request handling unit 11 (step S136). FIG. 14 shows an example of a confirmation UI for confirming a workflow. The confirmation UI includes a document name 511, a document URL 512, tags 513, workflow participants 514, a "Start WF" button 515 for starting the workflow, and a "Previous" button 516 for returning to the registration UI.

Referring back to FIG. 12, when the creator clicks on the "Start WF" button 515 to start the workflow using the user terminal 5 (step S137), the user request handling unit 11 requests the tag analysis unit 15 to send tags to be attached to the workflow document (step S138). The tag analysis unit 15 retrieves necessary tags from the tag definition DB 19 (steps S139 and S140) and sends the retrieved tags to the user request handling unit 11 (step S141). For example, the tag analysis unit 15 retrieves a workflow participants tag "WFZ: name:name: . . . ", indicating workflow participants, a status tag "Review_Requested" indicating that review of the workflow document is being requested, and a participant tag "To: name" indicating the next workflow participant.

The user request handling unit 11 sends the document ID and the tags to the metadata managing unit 12 (step S142). The metadata managing unit 12 registers the document ID and the tags in the metadata DB 18 (step S143). Take, for example, a workflow shown in FIG. 14. When the "Start WF" button 515 is clicked on to start the workflow, the following tags are attached to the workflow document: "Invention_Report XYZ_Laboratory WFZ:Suzuki:Sato:Tanaka Creator: Yamada Requesting_Review To:Suzuki".

Referring back to FIG. 12, when receiving an RSS feed request from the user terminal 5, the user request handling unit 11 of the metadata management unit 1 requests the RSS generating unit 14 to generate an RSS feed (step S144). The RSS generating unit 14 generates an RSS feed of the corresponding workflow document(s) and delivers it to the user terminal 5 (step S145).

FIG. 15 is a drawing used to describe how RSS feeds are filtered in an RSS delivery process. Assuming that there are three workflows of documents having tags "To:userA", "To:userB", and "To:userC", respectively, RSS feeds are filtered and only an RSS feed having a tag "To:userA" is delivered to the user A. RSS feeds may also be filtered by tags indicating document types such as "Invention_Report" and "Technical_Report". Thus, the exemplary workflow system of this embodiment can handle various types of documents and tasks with the same mechanism and enables organic integration of different systems which is difficult with a conventional workflow system.

FIGS. 16A through 16H show examples of RSS feed requests sent from the RSS reader 51 of the user terminal 5 to the metadata management unit 1. FIG. 16A shows a first format of an RSS feed request. In FIG. 16A, "http://server/" indicates the address of a server (i.e. the metadata management unit 1) sending RSS feeds, and "tag/" following "http://server/" and "/rss" at the end of the request indicate the start and end of tags used to select desired RSS feeds. Also in FIG. 16A, "[tags]" indicates a tag and "[value]" indicates a value of the tag. Specifying a tag such as "To", which has a special meaning in the workflow system, and its value separately in an RSS feed request makes it easier for the workflow system to analyze the tag. FIG. 16B shows an example of the first format shown in FIG. 16A. This example requests RSS feeds of workflow documents having a tag "To:userA". When the request receiving unit 141 of the RSS generating unit 14 receives the RSS feed request shown in FIG. 16B, the tag search unit 142 causes the metadata managing unit 12 to search the metadata DB 18 based on the tag "To" and the value "userA" and thereby identifies the corresponding workflow document(s). Then, the metadata generating unit 143 generates an RSS feed of the identified workflow document(s), and the response sending unit 144 sends the generated RSS feed to the user terminal 5.

FIG. 16C shows a second format of an RSS feed request. In FIG. 16C, "http://server/" indicates the address of a server (i.e. the metadata management unit 1) sending RSS feeds, and "tag/" following "http://server/" and "/rss" at the end of the request indicate the start and end of tags used to select desired RSS feeds. In this case, "[tags]" indicates a tag or tags and no value field "[value]" is provided. FIG. 16D shows a first variation of the second format where one tag "tag1" is specified as "[tags]", and FIG. 16E is an example of the first variation. This example requests RSS feeds of workflow documents having a tag "XYZ_Laboratory".

FIG. 16F shows a second variation of the second format where two tags "tag1" and "tag2" are specified as "[tags]". In the second variation, "tag1" and "tag2" are separated by "%20" that is the URL encoded representation of a blank character. FIG. 16G is an example of the second variation that requests RSS feeds of documents having a tag "XYZ_Laboratory" and a tag "Invention_Report".

FIG. 16H shows another example of the second variation where the tag "To" and its value "userA" are separated by a blank character "%20". This example has the same effect as that of the RSS feed request shown in FIG. 16B. When a tag, such as "To", having a special meaning in the workflow system is specified as "tag1", "tag2" is not treated as a tag but as the value of "tag1".

FIGS. 17A and 17B are drawings illustrating source code and a display on the user terminal 5 of an RSS feed of workflow documents having a tag "To:XYZ". In this example, clicking on "For Review" shown in FIG. 17B displays a list of workflow documents having tags "To:XYZ Requesting_Review", and clicking on "For Approval" displays a list of workflow documents having tags "To:XYZ Requesting_Approval".

FIGS. 18A and 18B are drawings illustrating source code and a display on the user terminal 5 of an RSS feed of workflow documents having tags "To:XYZ Requesting_Review". In this case, as shown in FIG. 18B, a list of workflow documents to be reviewed by user XYZ is displayed.

FIG. 19 is a sequence chart showing an exemplary review process.

As shown in FIG. 19, when an RSS feed is sent from the RSS generating unit 14 of the metadata management unit 1 to the user terminal 5 of a reviewer (step S151), the reviewer sends a request for a workflow document by clicking on a document link in the RSS feed from the user terminal 5 to the document registration WWW server 31 of the document registration unit 3 (step S152).

The document registration WWW server 31 requests the workflow status management unit 17 to obtain information on the workflow of the requested workflow document (step S153). Then, the workflow status management unit 17 requests the tag analysis unit 15 to analyze the tags attached the workflow document (step S154).

The tag analysis unit 15 refers to the tag definition DB 19 (steps S155 and S156) and returns the analysis result (including workflow status, workflow participants, and the next step to be taken) to the workflow status management unit 17 (step S157). The workflow status management unit 17 returns the workflow status to the document registration WWW server 31 of the document registration unit 3 (step S158).

Then, the document registration server 31 requests the authentication server 41 of the authentication unit 4 to authenticate the reviewer (step S159). The authentication server 41 sends an authentication request to the user terminal 5 (step S160). In response to the authentication request, the reviewer sends authentication information including an ID and a password to the authentication server 41 of the authentication unit 4 (step S161).

The authentication server 41 checks the authentication information against information stored in the organization/authentication information DB 42 (steps S162 and S163) and returns the authentication result to the document registration WWW server 31 of the document registration unit 3 (step S164). The document registration WWW server 31 sends the authentication result to the user request handling unit 11 of the metadata management unit 1 (step S165).

The document registration WWW server 31 retrieves the requested workflow document from the document registration DB 32 (steps S166 and S167) and sends the retrieved workflow document to the user terminal 5 (step S168).

Figure 20:
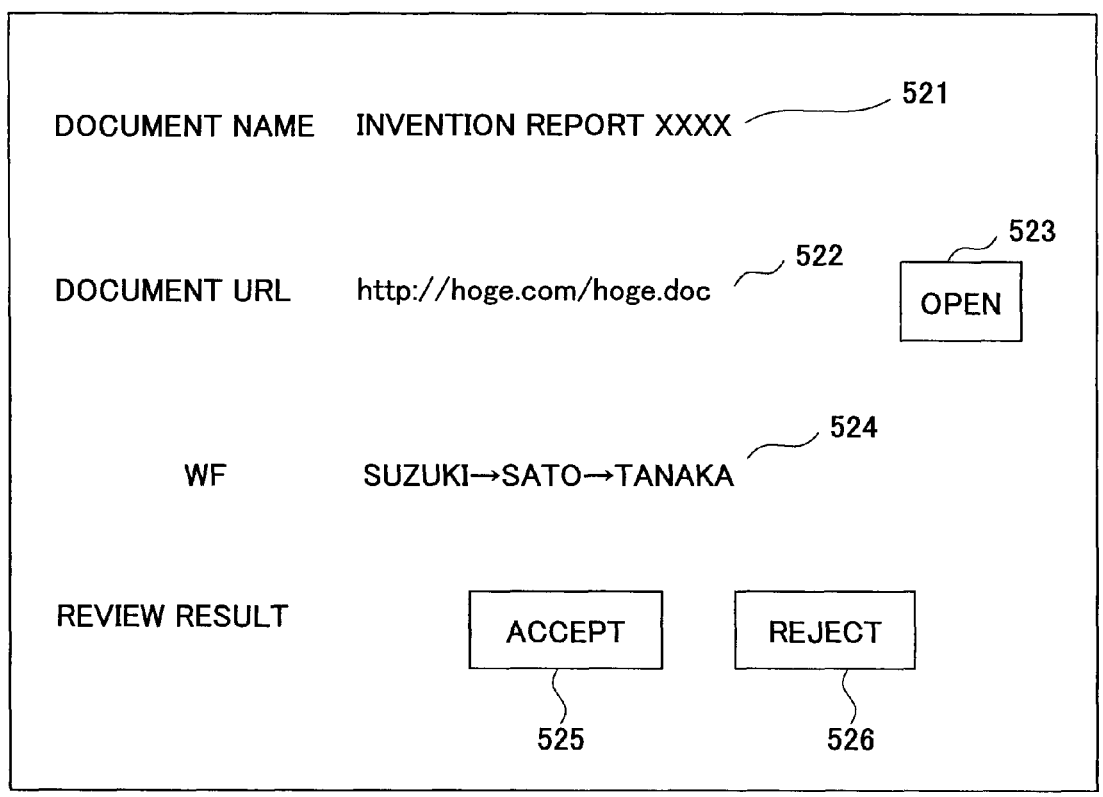
FIG. 20 is a drawing illustrating an exemplary user interface for reviewing a workflow document.

Meanwhile, the user request handling unit 11 of the metadata management unit 1 requests the UI generating unit 13 to generate a review UI (step S169). The UI generating unit 13 generates the review UI (step S170) and sends it to the user terminal 5 via the user request handling unit 11 (step S171). FIG. 20 shows an example of a review UI. The review UI includes a document name 521, a document URL 522, an "Open" button 523, workflow participants 524, an "Accept" button 525, and a "Reject" button 526.

Referring back to FIG. 19, when the reviewer sends a review result by clicking on either the "Accept" button 525 or the "Reject" button 526 (step S172), the user request handling unit 11 of the metadata management unit 1 receives the review result and reports the review result to the workflow status management unit 17 (step S173). The workflow status management unit 17 requests the tag analysis unit 15 to generate a tag corresponding to the review result (step S174).

When receiving the request, the tag analysis unit 15 refers to the tag definition DB 19 (steps S175) and requests the metadata managing unit 12 to update the metadata of the reviewed workflow document (step S176). Then, the metadata managing unit 12 updates the metadata in the metadata DB 18 (step S177). Take, for example, a case where the tags of the workflow document shown in FIG. 20 are "Invention_Report XYZ_Laboratory WFZ:Suzuki:Sato:Tanaka Creator:Yamada Requesting_Review To:Suzuki" before the review. If the reviewer accepts the workflow document, the tags are updated to "Invention_Report XYZ_Laboratory WFZ:Suzuki:Sato:Tanaka Creator:Yamada Reviewed:Suzuki To:Sato". If the reviewer rejects the workflow document, the tags are updated to "Invention_Report XYZ_Laboratory WFZ:Suzuki:Sato:Tanaka Creator:Yamada Rejected: Suzuki To:Yamada".

Referring back to FIG. 19, the workflow status management unit 17 of the metadata management unit 1 requests the RSS generating unit 14 to generate an RSS feed (step S178) and the RSS generating unit 14 generates and delivers the RSS feed (step S179).

<Tag Entry Assistance Mechanism>

Figures 21A, 21B:
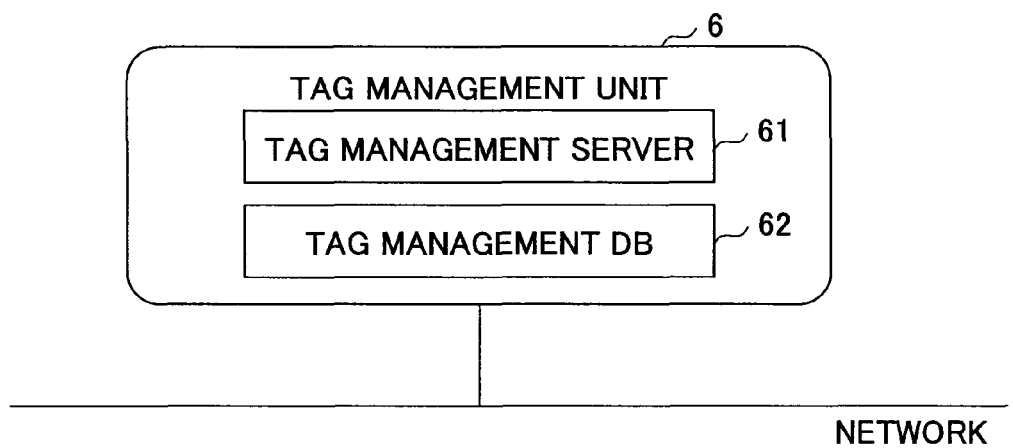
FIG. 21A is a drawing illustrating an exemplary configuration of a tag management unit for automatically presenting tags.
FIG. 21B is a table showing an exemplary tag management DB.

FIG. 21A shows an exemplary configuration of a tag management unit 6 for automatically presenting tags. FIG. 21B shows an example of a tag management database 62. As shown in FIG. 21A, the tag management unit 6 includes a tag management server 61 for responding to accesses via a network and a tag management database (DB) 62 for storing tags assigned to users and organizational units. The tag management unit 6 is connected to the network shown in FIG. 1 and functions as a part of the exemplary workflow system.

Each record in the tag management DB 62 includes an ID for identifying the record, a user or an organizational unit, and tags assigned to the user or the organizational unit.

Figure 22:
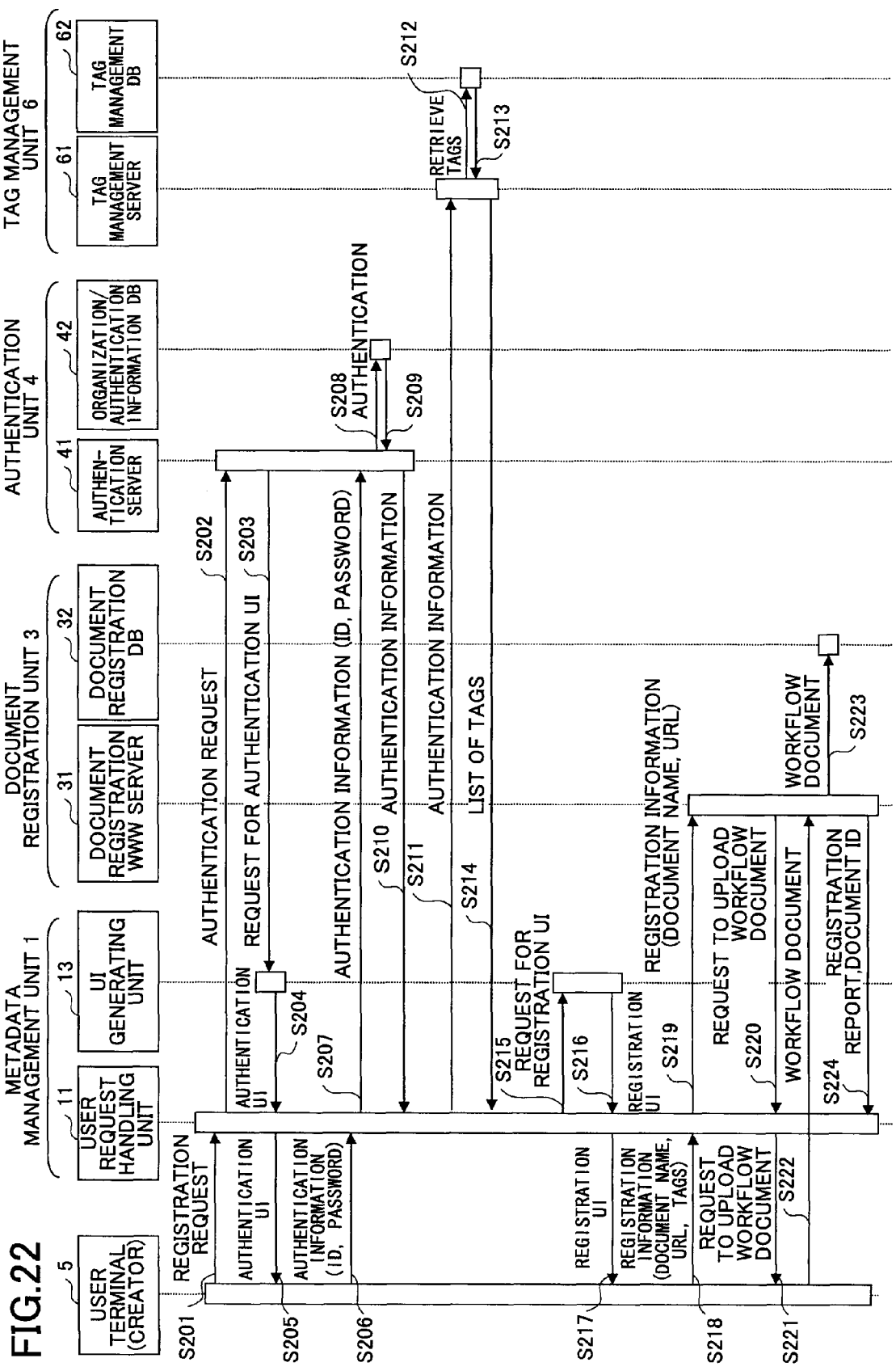
FIG. 22 is a sequence chart showing an exemplary process of registering a workflow document.

FIG. 22 is a sequence chart showing an exemplary process of registering a workflow document in the exemplary workflow system including the tag management unit 6. Steps following the exemplary process shown in FIG. 22 are substantially the same as those shown in FIG. 12.

As shown in FIG. 22, when the creator sends a request to register a workflow document to the user request handling unit 11 of the metadata management unit 1 from the user terminal 5 (step S201), the user request handling unit 11 requests the authentication server 41 of the authentication unit 4 to authenticate the creator (step S202). The authentication server 41 requests the UI generating unit 13 of the metadata management unit 1 to generate an authentication UI (step S203). The UI generating unit 13 generates an authentication UI and sends it to the user request handling unit 11 (step S204). Then, the user request handling unit 11 sends the authentication UI to the user terminal 5 (step S205).

When the creator enters an ID and a password on the authentication UI using the user terminal 5 (step S206), the user request handling unit 11 of the metadata management unit 1 sends the entered authentication information to the authentication server 41 of the authentication unit 4 (step S207). The authentication server 41 checks the authentication information against information stored in the organization/authentication DB 42 (steps 208 and 209), and if the creator is a legitimate user, sends the authentication information to the user request handling unit 11 of the metadata management unit 1 (steps S210).

The user request handling unit 11 of the metadata management unit 1 sends the authentication information to the tag management server 61 of the tag management unit 6 (step S211). The tag management server 61 retrieves a list of tags assigned to the corresponding user or organizational unit from the tag management DB 62 (steps S212 and S213) and sends the list to the user request handling unit 11 of the metadata management unit 1 (step S214).

When receiving the list of tags, the user request handling unit 11 requests the UI generating unit 13 to generate a registration UI (step S215). The UI generating unit 13 generates a registration UI and sends it to the user request handling unit 11 (step S216). Then, the user request handling unit 11 sends the registration UI to the user terminal 5 (step S217). The registration UI generated in step S216 is substantially the same as that shown in FIG. 13 except that the tags obtained from the tag management unit 6 are automatically entered in the tag entry field 503.

Referring back to FIG. 22, the creator enters a document name and a URL of the workflow document on the registration UI using the user terminal 5 (in this case, tags are already entered) and clicks on the "Display WF" button 505 (requests to register the workflow document and to display a workflow) (step S218). Then, the user request handling unit 11 of the metadata management unit 1 sends a request for registration of the workflow document together with the document name and the URL to the document registration WWW server 31 of the document registration unit 3 (step S219). The document registration WWW server 31 requests the user terminal 5 to upload the workflow document via the user request handling unit 11 of the metadata management unit 1 (steps S220 and S221).

In response to the request, the user terminal 5 sends the workflow document to the document registration WWW server 31 of the document registration unit 3 (step S222). The document registration WWW server 31 registers the workflow document in the document registration DB 32 (step S223). Then, the document registration WWW server 31 sends a registration report and an ID of the registered workflow document (document ID) to the user request handling unit 11 of the metadata management unit 1 (step S224).

Figure 23:
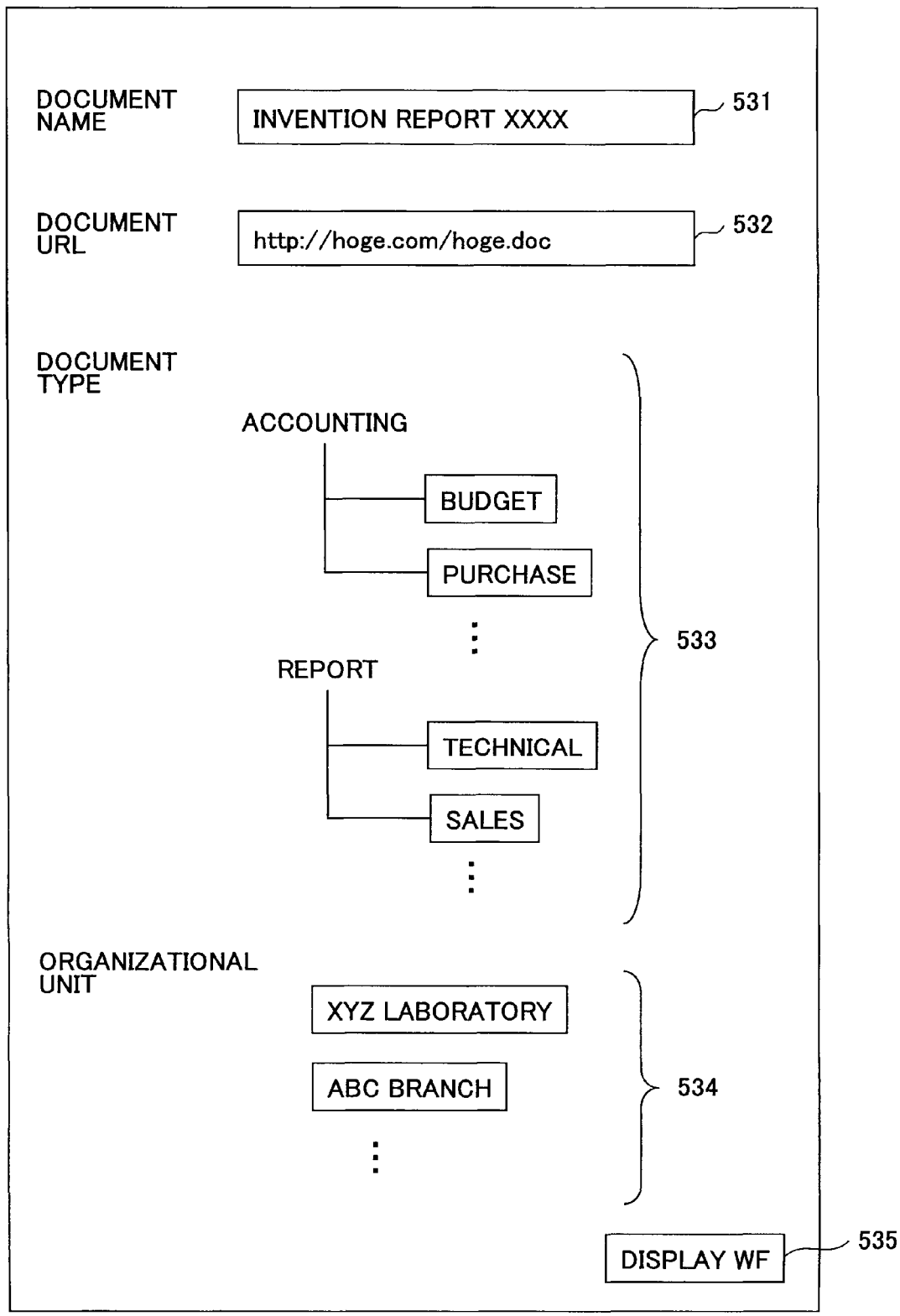
FIG. 23 is a drawing showing another exemplary user interface for registering a workflow document.

FIG. 23 shows another example of a registration UI. With this registration UI, a creator can specify tags by selecting document type buttons and organizational unit buttons. The registration UI shown in FIG. 23 includes a document name entry field 531 for entering the document name of a workflow document, a document URL entry field 532 for entering a URL indicating the registration destination of the workflow document (e.g. a URL indicating a location on the document registration WWW server 31), a document type selection field 533 including categorized buttons indicating document types (buttons are represented by rectangles containing document types such as "Budget", "Purchase", "Technical", and "Sales"), an organizational unit selection field 534 including buttons indicating organizational units (buttons are represented by rectangles containing organizational units such as "XYZ Laboratory" and "ABC Branch"), and a "Display WF" button 535 for searching for and displaying a workflow based on the conditions specified in the above fields.

FIG. 24 shows exemplary code describing relationships between tags and buttons representing the document types and organizational units on the registration UI shown in FIG. 23. The exemplary code shown in FIG. 24 includes for each organizational unit a description D1 enclosed between "<dept . . . >" and "</dept>". The description D1 includes a description D2 enclosed between "<doc_type>" and "</doc_type>". The description D2 includes for each category a description D3 enclosed between "<item . . . >" and "</item>". Further, the description D3 includes multiple descriptions D4 enclosed between "<button" and ">". Each of the descriptions D4 defines a button and a tag assigned to the button.

In the first line of the description D1 provided for each organizational unit, a label such as "XYZ Laboratory" is specified as the value of an attribute "name". In the first line of the description D3 provided for each category, a label such as "Accounting" is specified as the value of an attribute "name". In the description D4 provided for each button, a label such as "Budget" is specified as the value of an attribute "name", and a tag such as "Budget_Document" is specified as the value of an attribute "tag".

The code described above is stored in the metadata management unit 1 (alternatively, the code may be stored in another server). The UI generating unit 13 obtains a list of organizational units from the values of the attributes "name" of the descriptions D1, and generates, based on the obtained list, HTML data representing the organizational unit selection field 534 of FIG. 23 including organizational unit buttons.

The UI generating unit 13 also obtains a list of categories from the values of the attributes "name" of the descriptions D3, obtains a list of document types from the values of the attributes "name" of the descriptions D4, and generates, based on the obtained lists, HTML data representing the document type selection field 533 of FIG. 23 including document type buttons. When there are duplicates in the lists of categories and document types obtained from the descriptions D1 of multiple organizational units, the UI generating unit 13 sorts and merges the items in each of the lists before generating the HTML data.

When a user clicks on the buttons in the document type selection field 533 and the organizational unit selection field 534, corresponding tags are selected according to the relationship shown in FIG. 24. For example, when a user clicks on "Budget" in the document type selection field 533 and on "XYZ Laboratory" in the organizational unit selection field 534, the first one of the descriptions D1 shown in FIG. 24 is identified based on the organizational unit "XYZ Laboratory" and the tag "Budget_Document" is selected based on the document type "Budget".

<Summary>

As described above, embodiments of the present invention provide the following advantages:

(1) A creator of a workflow document can determine a workflow just by attaching intuitive tags indicating the content of the workflow document. Therefore, a workflow system according to an embodiment of the present invention makes it easier to determine a workflow compared with a conventional workflow system where a creator of a workflow document has to determine a workflow by referring to rules in one's organization.

(2) A workflow system of an embodiment of the present invention does not employ a dedicated architecture for handling workflow documents and tasks. Therefore, the system Does not require complicated maintenance.

Allows using a normal Web browser as a client.

Has high flexibility and scalability.

Can cooperate even with a document management system having no workflow function.

(3) An RSS reader has a function to periodically obtain RSS feeds. Therefore, using an RSS feeder eliminates the need to request the users to review and/or approve workflow documents by, for example, sending emails. This improves efficiency of information delivery in a workflow system.

(4) Using an RSS reader makes it easier for a user to browse review/approval requests and thereby improves working efficiency.

An embodiment of the present invention provides a workflow management method that makes it unnecessary for a user to determine a workflow by oneself.

Another embodiment of the present invention provides a highly flexible and highly scalable workflow management apparatus that makes it unnecessary for a user to determine a workflow by oneself.

In the present application, the user request handling unit 11, the metadata managing unit 12, the UI generating unit 13, the workflow determination requesting unit 16, the workflow status management unit 17, and the workflow determining unit 2 may correspond to a workflow starting unit. Also in the present application, the user request handling unit 11, the metadata managing unit 12, the UI generating unit 13, the RSS generating unit 14, and the workflow status management unit 17 may correspond to a review/approval unit.

The present invention is not limited to the specifically disclosed embodiments, and variations and modifications may be made without departing from the scope of the present invention.

The present application is based on Japanese Priority Application No. 2006-305429 filed on Nov. 10, 2006, and Japanese Priority Application No. 2007-271529 filed on Oct. 18, 2007, the entire contents of which are hereby incorporated herein by reference.

What is claimed is:

1. A workflow management method, implemented on a workflow management apparatus, comprising:
    a workflow starting step of determining, at the workflow management apparatus, a workflow based on one or more tags attached to a workflow document based on a received input from a user, retrieving a status tag, a document type tag, and a participant tag from a tag database, attaching the retrieved status tag, document type tag, and participant tag to the workflow document, and starting the workflow;
    a document filtering step of filtering, at the workflow management apparatus, the workflow document based on one or more tags attached to the workflow document indicating a document type; and
    a review/approval step of requesting, at the workflow management apparatus, review or approval of the workflow document based on the status tag and the participant tag and updating the status tag and the participant tag after the review and/or approval,
    wherein the workflow starting step includes
        registering the one or more tags for determining the workflow in association with the workflow document,
        determining the workflow based on the registered one or more tags and displaying the determined workflow to request confirmation for starting the workflow, and
        registering the participant tag indicating a first participant of the workflow and the status tag indicating a status of the workflow in association with the workflow document; and
    the review/approval step includes delivering metadata of the workflow document to a corresponding participant based on the participant tag to request the review or approval of the workflow document,
        updating the status tag and, if there is a next participant, updating the participant tag so as to indicate the next participant based on the result of the review or approval, and
repeating the delivering and updating steps until the workflow is completed.

2. The workflow management method as claimed in claim 1, wherein, the workflow document is identified by searching a database of workflow documents based on a tag specified in a request for metadata and the metadata of the identified workflow document are delivered.

3. The workflow management method as claimed in claim 1, further comprising:
    authenticating a user when the user tries to register the workflow document or when the user tries to review or approve the workflow document and allowing a subsequent process if the user is a legitimate user.

4. The workflow management method as claimed in claim 1, further comprising:
    obtaining definitions of the status tag and the participant tag from the tag database containing the definitions when confirming a status and a participant of the workflow during the review or approval or when attaching or updating the status tag and the participant tag.

5. The workflow management method as claimed in claim 1, further comprising:
    determining the one or more tags to be attached to the workflow document based on a user name or an organizational unit of a user.

6. The workflow management method as claimed in claim 1, further comprising:
    determining the one or more tags to be attached to the workflow document based on a document type and/or an organizational unit selected by a user.

7. A workflow management apparatus, comprising:
    a non-transitory memory configured to store a tag definition database;
    a workflow starting unit configured
        to determine a workflow based on one or more tags attached to a workflow document based on a received input from a user,
        to retrieve a status tag, a document type tag, and a participant tag from the tag definition database stored in the non-transitory memory,
        to attach the retrieved status tag, document type tag, and participant tag to the workflow document, and
        to start the workflow; and
    a review/approval unit configured to filter the workflow document based on document type tags,
        to request review or approval of the workflow document based on the status tag, the document type tag, and the participant tag and to update the status tag and the participant tag after the review or approval,
    wherein
        the workflow starting unit is configured to register the one or more tags for determining the workflow in association with the workflow document, to determine the workflow based on the registered one or more tags, to display the determined workflow to request confirmation for starting the workflow, and to register the participant tag indicating a first participant of the workflow and the status tag indicating a status of the workflow in association with the workflow document; and
        the review/approval unit is configured to deliver metadata of the workflow document to a corresponding participant based on the participant tag to request the review or approval of the workflow document, and to update the status tag and, if there is a next participant, to update the participant tag so as to indicate the next participant based on the result of the review or approval.

8. The workflow management apparatus as claimed in claim 7, wherein the review/approval unit is configured to identify the workflow document by searching a database of workflow documents based on a tag specified in a request for metadata and to deliver the metadata of the identified workflow document.

9. The workflow management apparatus as claimed in claim 7, further comprising:
    an authentication unit configured to authenticate a user when the user tries to register the workflow document or when the user tries to review or approve the workflow document and to allow a subsequent process if the user is a legitimate user.

10. The workflow management apparatus as claimed in claim 7, further comprising:
    a tag analysis unit configured to obtain definitions of the status tag and the participant tag from the tag definition database for use by the workflow starting unit to attach the status tag and the participant tag to the workflow document or for use by the review/approval unit to confirm a status and a participant of the workflow during the review or approval or to update the status tag and the participant tag.

11. The workflow management apparatus as claimed in claim 7, further comprising:
a tag management unit configured to determine the one or more tags to be attached to the workflow document based on a user name or an organizational unit of a user.

12. The workflow management apparatus as claimed in claim 7, further comprising:
a tag management unit configured to determine the one or more tags to be attached to the workflow document based on a document type or an organizational unit selected by a user.

* * * * *